INVENTORS
EDWARD C. WINGFIELD
LOUIS J. DAIGLE
BY David S. Fishman
ATTORNEY

INVENTORS
EDWARD C. WINGFIELD
LOUIS J. DAIGLE
BY David S. Fishman
ATTORNEY

INVENTORS
EDWARD C. WINGFIELD
LOUIS J. DAIGLE
BY David S. Fishman
ATTORNEY

INVENTORS
EDWARD C. WINGFIELD
LOUIS J. DAIGLE
BY David S. Fishman
ATTORNEY

INVENTORS
EDWARD C. WINGFIELD
LOUIS J. DAIGLE
BY David S. Fishman
ATTORNEY

United States Patent Office 3,341,707
Patented Sept. 12, 1967

3,341,707

APPARATUS FOR AZIMUTH ACQUISITION AND TRACKING OF TRANSDUCERS IN A DIRECTIONAL COMMUNICATION SYSTEM

Edward C. Wingfield, Wethersfield, and Louis J. Daigle, Manchester, Conn., assignors to United Aircraft Corporation, East Hartford, Conn., a corporation of Delaware Filed Mar. 23, 1964, Ser. No. 353,722
18 Claims. (Cl. 250—199)

This invention relates to an acquisition and tracking system and technique for a communication system. More particularly, this invention relates to an acquisition and tracking system for a communication system using a narrow, well-collimated beam pattern.

There are many advantages to a communication system employing narrow beam radiation patterns. For example, energy is concentrated in a specific direction thereby minimizing power requirements, and the high directivity of the beam makes interception extremely difficult. Any signal source capable of being concentrated into a well-collimated beam and modulated can be used in this communication system. For example, a microwave beam or an intense light source, especially a continuous wave laser are especially suitable. However, the clandestine characteristics of this communication system pose difficult problems in acquisition and tracking between transmitter and receiver. Establishment of contact requires a methodical search in azimuth, and the system must operate in a plane or within a band of planes defined by the divergence of the communicated beam.

The following discussion will be directed to an acquisition and tracking system for an optical communication system wherein a light beam is modulated for the transmission of intelligence. The system has two identical units, one designated as a transmitter and the other designated as a receiver. Each unit has a signal generating section, a signal receiving section, and logic circuitry. Operation will be described for the horizontal plane case.

Acquisition, i.e. contact between transmitter and receiver, is accomplished by rotating or scanning the signal generator of the transmitter and by generating digital information corresponding to the instantaneous azimuth angle of transmitter operation. A digital shaft encoder is mechanically connected to the transmitter signal generator drive. Assuming that the encoder has an azimuth reference, the encoder provides an identifying digital number for each incremental angle that it is able to resolve. The parallel output of the encoder is converted to a serial pulse train, and the resulting pulse train is fed through a signal mixer to a modulator to generate a pulsed transmitted signal in accordance with the instantaneous azimuth position of the transmitter signal generator. The modulation of the transmitted signal then indicates the instantaneous transmitting direction.

The receiver unit is capable of monitoring all directions in the horizontal plane simultaneously in order to detect the transmitted light beam. The signal receiver section of the receiver includes optical equipment such as an inverted cone and photodetector or fiber optics and a photodetector to achieve this omnidirectional capability. Once a coded transmission signal is detected, the information is stored on a shift register. A bi-directional homing circuit compares the shift register information with the shaft encoder information corresponding to the position of the signal generating section of the receiver, and the homing circuit energizes a drive motor to position the receiver signal generating section in a direction 180° removed from that designated by the received coded azimuth information. The signal generating section of the receiver then transmits its position azimuth information back to the receiver section of the original transmitter. This azimuth information is detected by the receiver section of the transmitter and is stored on the transmitter shift register. The transmitter homing circuit compares this shift register information with the output of the shaft encoder to orient the transmitter signal generator 180° from the stored information to the desired azimuth angle at which the transmitter and receiver are optically aligned for the transfer of intelligence.

The foregoing discussion has assumed that the transmitter and receiver units had a predetermined common azimuth reference. In a more practical situation the transmitter and receiver units would not have a common azimuth reference. Acquisition operation in this latter situation requires that the signal generating section of the receiver also operate initially in a scanning mode and send out its own instantaneous azimuth information and also the received azimuth information. The receiver section of the original transmitter will receive this two-fold information from the original receiver and will return two azimuth signals to the original receiver, one azimuth signal being the angle of transmission of the original transmitter and the other azimuth signal being the angle of transmission of the transmitter section of the original receiver. The receiver and transmitter units include modified logic systems for actuating the homing systems of each unit.

Following initial acquisition it becomes very important to maintain continuous alignment between transmitter and receiver or else total loss of contact may result, even in stationary systems. Thus, an automatic tracking system is also incorporated in the communication system. Of course, the tracking is essential if a mobile system is desired.

The tracking system utilizes phase sensitive detection techniques at the receiver sections of both units to generate error signals due to misalignment. The tracking mechanism includes a shutter mechanism for alternately sampling the intensity of the signal incident on the left and right sides of the center of the receiver optics. Differences in light intensity between right and left of center produce a modulation envelope on the received signal. The shutter is phased with an oscillatory signal derived from the shutter drive system, and demodulation of the received signal using the derived oscillatory signal as a reference yields a phase sensitive error signal calling for a right or left correction. An error signal is then sent to the other unit in the communications system so that the other unit can be properly adjusted right or left.

Error signal transmission between the units of the communication system can be accomplished by using a pulse code system. For example, a continuous transmission of a pulse train at a frequency higher than the intelligence bandwidth could be used to indicate no azimuth error; a transmission of double pulses at the same frequency as the original pulse train could indicate a correction left, and triple pulses at the same frequency could indicate a correction to the right. The continuous monitoring of beam direction can be accomplished as long as the error signals do not interfere with the transmission of intelligence.

The receiver section of each communication unit is equipped with the phase sensitive detector equipment. Phase sensitive techniques are commonly used in the field of electronics, but the particular application to the present communication system is actually as a double servo, each with a remote error sensor.

Accordingly, one object of the present invention is to produce a novel acquisition and tracking system and technique for a communication system.

Another object of the present invention is to produce a novel acquisition and tracking system and technique for a communication system employing a narrow, well-collimated communication beam.

Still another object of the present invention is to produce a novel acquisition and tracking system and technique for an optical communication system.

Still another object of the present invention is to produce a novel acquisition and tracking system and technique for a communication system that is cladestrine and difficult to intercept.

Still another object of the present invention is to produce a novel acquisition and tracking system and technique for a communication system in which acquisition is accomplished through transmission and reception of digital information corresponding to azimuth positions at which contact is made between transmitting and receiving units.

Other objects and advantages will be apparent from the specification and claims, and from the accompanying drawings which illustrate an embodiment of the invention.

FIG. 1 showing the system of FIG. 1 being operated as receiver system of the present invention.

The communication system with which the present invention is concerned has two identical units, one being identified as a transmitter and the other being identified as a receiver. The mode of operation of either unit can be selected so that either unit can be made to operate as a receiver or transmitter as desired.

Figure 1:
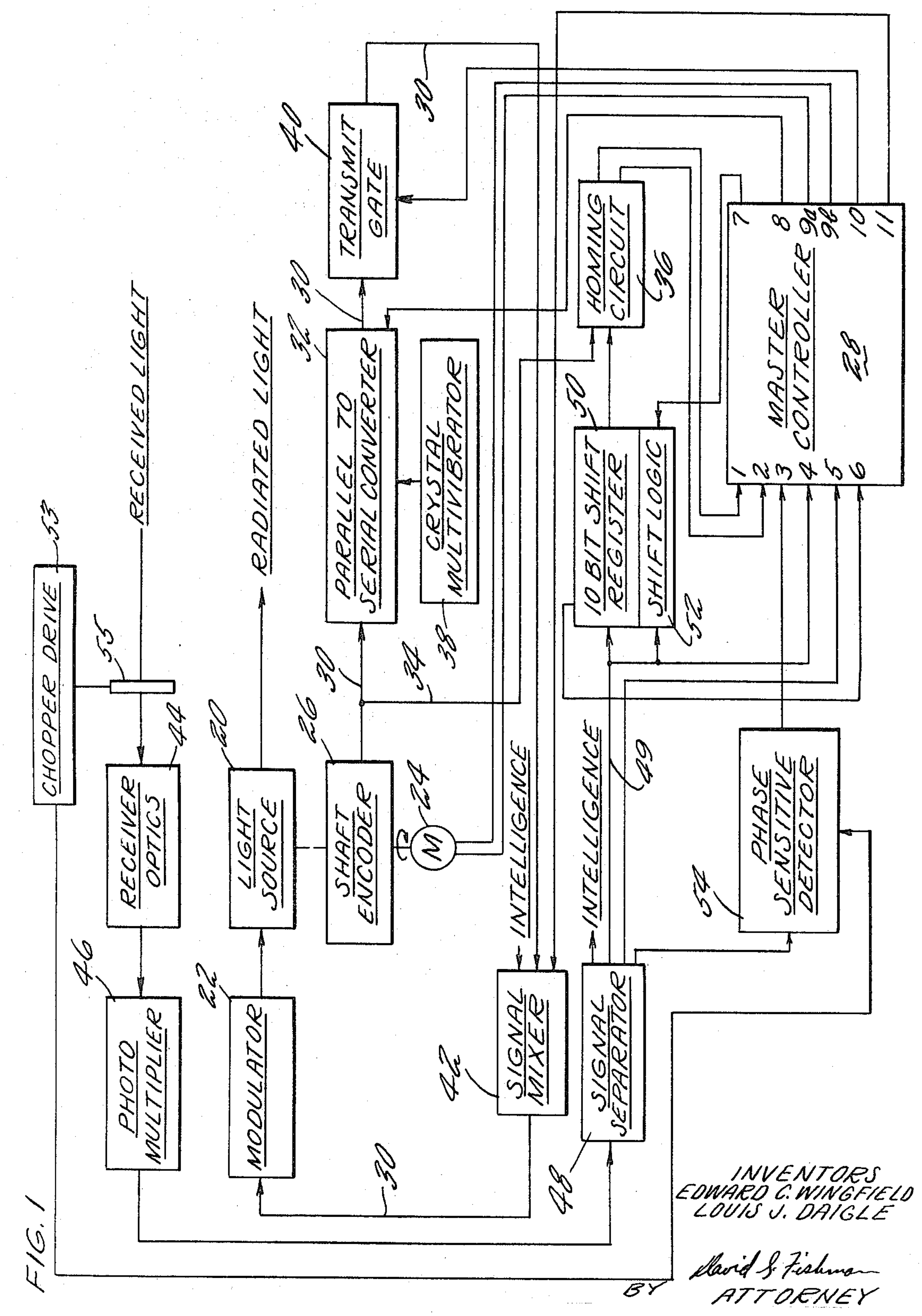

FIG. 1 shows one of the two identical units. The signal generating section has a light source 20 and a modulator 22 connected to the light source. Light source 20 can be any high power light source such as a continuous wave laser, and light source 20 may include collimating optics. Motor 24 is mechanically connected to light source 20 to rotate the light source in a horizontal plane, and a shaft encoder 26 is mechanically connected to the drive connection between motor 24 and light source 20. Motor 24 is energized through conductors connected to terminals *9a* and *9b* of master controller 28.

Shaft encoder 26 is connected via a portion of conductor 30 to a parallel to serial converter 32, and shaft encoder 26 is also connected via branch conductor 34 to a homing circuit 36. Homing circuit 36 is connected to input terminals 1 and 2 of a master controller 28. Parallel to serial converter 32 is actuated by a crystal multivibrator

38, and converter 32 is connected to output terminal 8 of master controller 28. Converter 32 is connected via a portion of conductor 30 to a transmit gate 40 which is also connected to output terminal 10 of master controller 28, and gate 40 is connected via another portion of conductor 30 to a signal mixer 42.

Signal mixer 42 is connected via another portion of conductor 30 to modulator 22, and signal mixer 42 is also connected to output terminal 11 of master controller 28. Signal mixer 42 may be any well-known device, such as a summing circuit, capable of receiving input signals of different frequencies and delivering these signals to modulator 22 to modulate light source 20. The input to signal mixer from gate 40 is an acquisition signal; the input from terminal 11 of master controller 28 is a tracking signal; and there is an intelligence input signal, as shown, as from a microphone.

The signal receiving section of the unit has receiver optics 44 and a photomultiplier 46 connected to the receiver optics. Photomultiplier 46 is connected to a signal separator 48 which may be any well-known device such as a plurality of bandpass amplifiers capable of discriminating between signals of various frequencies. Output channel 49 from signal separator 48 is connected in parallel as shown to carry acquisition signals to a shift register 50, a shift register logic unit 52, and input terminal 4 of master controller 28. Shift register 50 is connected to deliver a signal to input terminal 6 of master controller 28. Shift register logic unit 52 is a sampling device for sampling the storage units of register 50, and it is connected to output terminal 7 of master controller 28.

Another output channel from signal separator 48 is connected to deliver tracking signals to input terminal 5 of master controller 28, and still another output channel from signal separator 48 is connected through phase sensitive detector 54 to input terminal 3 of master controller 28. Phase sensitive detector 54 is in turn connected to receive a signal from a chopper drive motor 53 which is connected to chopper 55 arranged to cample the intensity of the signal incident on receiver optics 44. Still another output channel from signal separator 48 carries intelligence signals, as shown, to a device such as earphones or a speaker.

Figure 2:
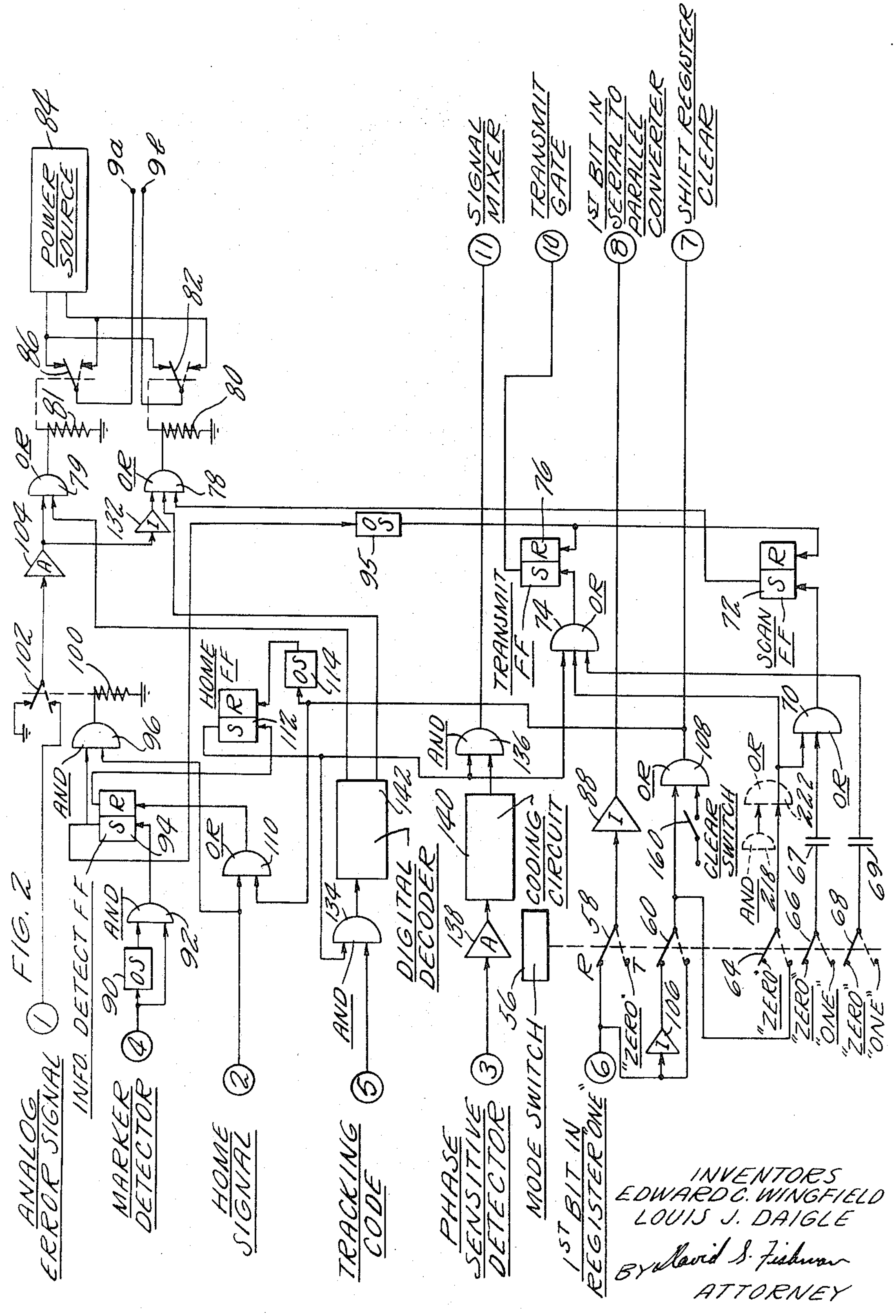
FIG. 2 is a circuit diagram of the master controller of FIG. 1 showing the system of FIG. 1 being operated as a receiver.

Referring now to the schematic of master controller 28 as shown in FIG. 2, mode control switch 56 is manually operated to designate the unit of FIG. 1 as a receiver or as a transmitter. The ganged switches 58, 60, 64, 66 and 68, hereinafter referred to collectively as the ganged mode switches, are all in the up position as designated by the solid line when mode switch 56 is positioned to designate the system of FIG. 1 as a receiver, and the ganged mode switches are in the down position as indicated by the dotted lines when switch 56 is positioned to designate the equipment as a transmitter. Once a selection is made to operate a particular unit as a transmitter or a receiver, the selection is not changed because information can be received and transmitted in either mode, and the circuit logic requires the mode chosen to be fixed. Several of the terminals for the ganged mode switches have "zero" or "one" level input signals as labeled.

In operation as a transmitter, the ganged mode switches are in the dotted position. A "one" signal is delivered via switch 66 through coupling capacitor 67 to OR gate 70 which will pass a "one" level signal but which will not pass a "zero" level signal. The signal is delivered from OR gate 70 to set scan flip-flop 72. At the same time, a "one" signal is delivered via switch 68 through coupling capacitor 69 to OR gate 74 and is passed through OR gate 74 to set transmit flip-flop 76. Capacitors 67 and 69 allow the passage of signals to set flip-flops 72 and 76, respectively, either when mode switch 56 is moved to the transmit position or when the power supply is activated to supply the "one" and "zero" level signals at the terminals of switches 58, 60, 64, 66 and 68, and these capacitors then isolate flip-flops 72 and 76 from the setting signals after the flip-flops have been set. The output resulting from the setting of flip-flop 72 is delivered to OR gate 78 and passes through the gate to actuate relay 80. Actuation of relay 80 moves switch 82 downward to the dotted position to connect one side of power source 84 to output terminal *9b* while the other side of the power source is connected through switch 86 to output terminal *9a*. Connecting the power source 84 to terminals *9a* and *9b* in this manner results in power source 84 being connected across motor 24 to cause the motor to rotate in a clockwise direction. Prior to the actuation of relay 80, switches 82 and 86 were in the upward position indicated by the solid lines, and motor 24 was stationary since power source 84 was not connected across the motor. Thus, the actuation of relay 80 causes a clockwise rotation of motor 24. The output from the setting of transmit flip-flop 76 is delivered to output terminal 10 which, as can be seen in FIG. 1, is connected to transmit gate 40, and the output from flip-flop 76 opens normally closed gate 40.

Actuation of motor 24 results in scanning or rotation of light source 20 in a horizontal plane, and shaft encoder 26 will also be rotated and will generate a binary output as a function of azimuth angle. There will, of course, be a fixed dwell time at each output of the encoder, depending upon design characteristics of the system, before a new encoder output is generated corresponding to a new azimuth position.

Figure 4:
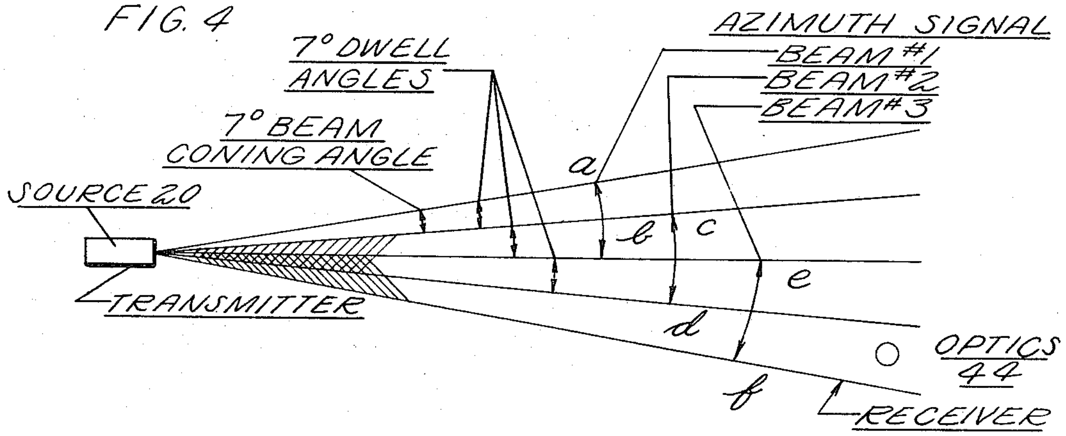
FIG. 4 is a diagrammatic representation of a number of transmitted beams at different azimuth angles.

The design characteristics of a typical system can be best understood with reference to FIG. 4. Assume that the beam generated by source 20 has a coning angle of 0.7°, and assume that shaft encoder 26 has nine binary output levels ranging from $2^0$ to $2^8$. The nine angle bits can split up one revolution of the shaft encoder into 512 equal segments or angle increments so that the encoder is able to resolve azimuth angles to 1/512 of a revolution which is approximately 0.7°. The dwell angle for each encoder output, i.e. the angle through which an edge of a beam moves during any one encoder output, is also 0.7° as shown in FIG. 4. The dwell time at each encoder output will depend on the scanning speed of source 20. For example, at a scanning speed of one revolution in five seconds, the dwell time will be about 0.01 second. Selecting a 30 kc. rating for multivibrator 38, the information indicating azimuth angle would be transmitted approximately 30 times at each encoder output. Also, received interception is assured because of a beam overlap of 50%; during scanning mean #1 would be present from position *a* to *b*, beam #2 from *c* to *d*, and beam #3 from *e* to *f*, etc.

Figures 7, 8, 9:
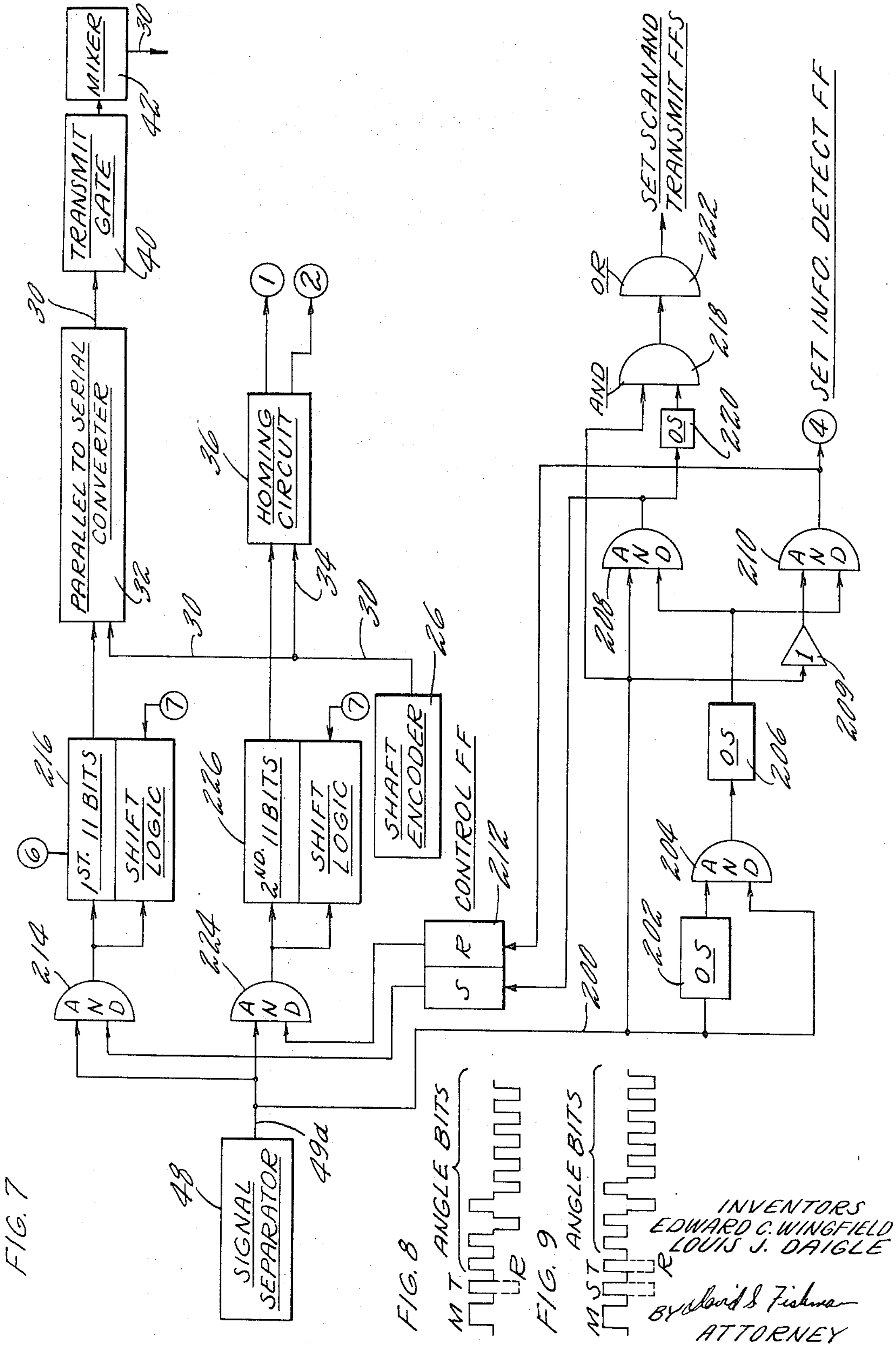
FIG. 7 is a showing of a modification of the system of FIG. 1 for use when transmitter and receiver units do not have a predetermined common azimuth reference.
FIG. 8 is a showing of a typical transmitted azimuth information beam used in connection with the system of FIG. 1.
FIG. 9 is a showing of a typical transmitted azimuth information beam used in connection with the modified system of FIG. 7.

The parallel output of shaft encoder 26 of FIG. 1 is delivered to parallel to serial converter 32 where it is sequentially sampled by crystal multivibrator 38 and converted to a serial pulse train. A typical serial pulse train fed from converter 32 to gate 40 is shown in FIG. 8. The train consists of a marker pulse M to indicate the beginning of a pulse train, a level "one" pulse T or a level "zero" pulse R to indicate operation of the unit as either a transmitter or receiver, respectively, and then a number of pulses corresponding to angle bits. The mode designation pulse T or R is delivered to converter 32 from output terminal 8 of master controller 28. The level of this output signal from terminal 8 is determined by the position of switch 58 (FIG. 2) which, when the unit is operated as a transmitter, is in the dotted position and delivers a "zero" to inverter 88 where it becomes a "one" to indicate operation as a transmitter.

Transmit gate 40 was opened by the signal from transmit flip-flop 76, and the information train is passed to mixer 42 and modulator 22 and thence impressed on the output from light source 20 and transmitted as a search signal in the form of a narrow light beam. The content of each complete bit pattern will change as the azimuth position of light source 20 changes, but each complete bit pattern will consist of a marker pulse M, a mode designation pulse T (when operating as a transmitter) and a number of angle bits.

Turning now to a consideration of the reception of the azimuth angle information generated by the transmitting unit, the system diagram of FIG. 1 shows the block diagram for the receiver unit as well as the transmitting unit. However, for operation as a receiver unit the master control mode switch 56 (FIG. 2) is positioned to designate the equipment as a receiver whereby the ganged mode switches 58, 60, 64, 66 and 68 are in the up position as shown by the solid lines. The receiver optics 44 monitors in all directions simultaneously in the horizontal plane in order to detect the transmitter azimuth signal from whatever azimuth position the transmitter may be operating. Any azimuth information incident on receiver optics 44 is transmitted to photomultiplier 46 and thence to signal separator 48. The output from signal separator 48 is delivered in parallel to shift register 50, to logic unit 52, and to input terminal 4 of master controller 28. Logic unit 52 includes a counter operating in well-known fashion to close an input gate to the storage elements of shift register 50 when a complete pulse train has been stored in shift register 50. Returning to FIG. 2, the input to terminal 4 of master controller 28 is delivered to a coincidence circuit comprising a one-shot monostable multivibrator 90 and an AND gate 92. Terminal 4 is connected to both monostable multivibrator 90 and AND gate 92, and this coincidence circuit is used to detect a marker pulse M. A delivery of a marker pulse to input terminal 4 triggers monostable multivibrator 90 which in turn delivers a pulse to AND gate 92. Due to the inherent delay in the actuation of multivibrator 90, AND gate 92 will open only when a marker pulse is delivered to input terminal 4. A pulse of shorter duration than the wide marker pulse will not be present at AND gate 92 when the delayed output from multivibrator 90 is delivered to AND gate 92; thus, a pulse of shorter duration than a marker pulse will not open AND gate 92, thereby insuring that the receiver system will not be triggered into operation until a marker pulse is received at optics 44.

The opening of AND gate 92 results in the delivery of a signal to set information detector flip-flop 94, and one output from information detector flip-flop 94 delivers reset signals to transmit flip-flop 76 and scan flip-flop 72 to insure that these elements have been reset. This reset signal passes through one-shot monostable multivibrator 95 prior to resetting flip-flops 76 and 72 so that it is delayed for a time equal to about one half of a pulse train period. The output from information detector flip-flop 94 is also delivered to AND gate 96 to open AND gate 96 and energize relay 100, this input signal to AND gate 96 serving to open the gate because the other input is already present in the form of a signal from input terminal 2 of master controller 28. The signal at input terminal 2 is derived from homing circuit 36 and will be explained in more detail hereinafter. The energizing of relay 100 moves normally open switch 102 to the closed position as shown by the dotted line to allow any signal present at input terminal 1 of master controller 28 to pass through to amplifier 104 to energize motor 24 in the manner to be described hereinafter. As will also be discussed hereinafter, any signal present at input terminal 1 of master controller 28 is derived from homing circuit 36 and constitutes an analog error signal for aligning the light source 20 with the original transmitted beam incident on receiver optics 44.

The train of azimuth information, including the marker pulse, the mode designation bit, and the angle information bits passes from signal separator 48 to shift register 50. The first bit stored in shift regiter 50 is the mode designator bit, a "one" level signal indicating that the pulse train originated at a transmitter unit and a "zero" level indicating origination at a receiver unit.

This mode designation bit is delivered from shift register 50 to input terminal 6 of master controller 28. If this designator bit is a "zero" the receiver unit ignors the angle informatoin by inverting the signal to a "one" level at inverter 106 and then passing this "one" level signal through switch 60 and OR gate 108 for clearing and resetting purposes. The pulse passing through OR gate 108 is delivered to OR gate 110 which will only pass a "one" level signal, and thence to the reset side of information detector flip-flop 94 to reset flip-flop 94, close AND gate 96, and deenergize relay 100. The resetting of flip-flop 94 results in a carry signal being delivered to set home flip-flop 112, but home flip-flop 112 is immediately reset by the pulse from OR gate 108 delivered to the reset side of home flip-flop 112 through one-shot monostable multivibrator 114 to provide ahe necessary delay so that flip-flop 112 is reset immediately after being set by the carry from flip-flop 94. The "one" level signal from gate 108 is also delivered to output terminal 7 and thence to shift logic unit 52 to clear the shift register.

If the mode designation signal delivered to input terminal 6 of master controller 28 is a "one" level signal to indicate that the angle information is coming from a transmitter as desired, the receiver will be allowed to go into a homing mode of operation. The "one" level signal at input terminal 6 is inverted to a "zero" signal in inverter 88 and is delivered to output terminal 8 and thence to converter 32 to designate the information to be generated as originating at a receiver. The "one" level signal is also inverted to a "zero" signal at inverter 106 and is blocked by OR gate 108. The angle bit information incident on receiver 44 is now stored in shift register 50 in preparation for the homing operation of the light signal source 20 of the receiver unit.

Figure 3:
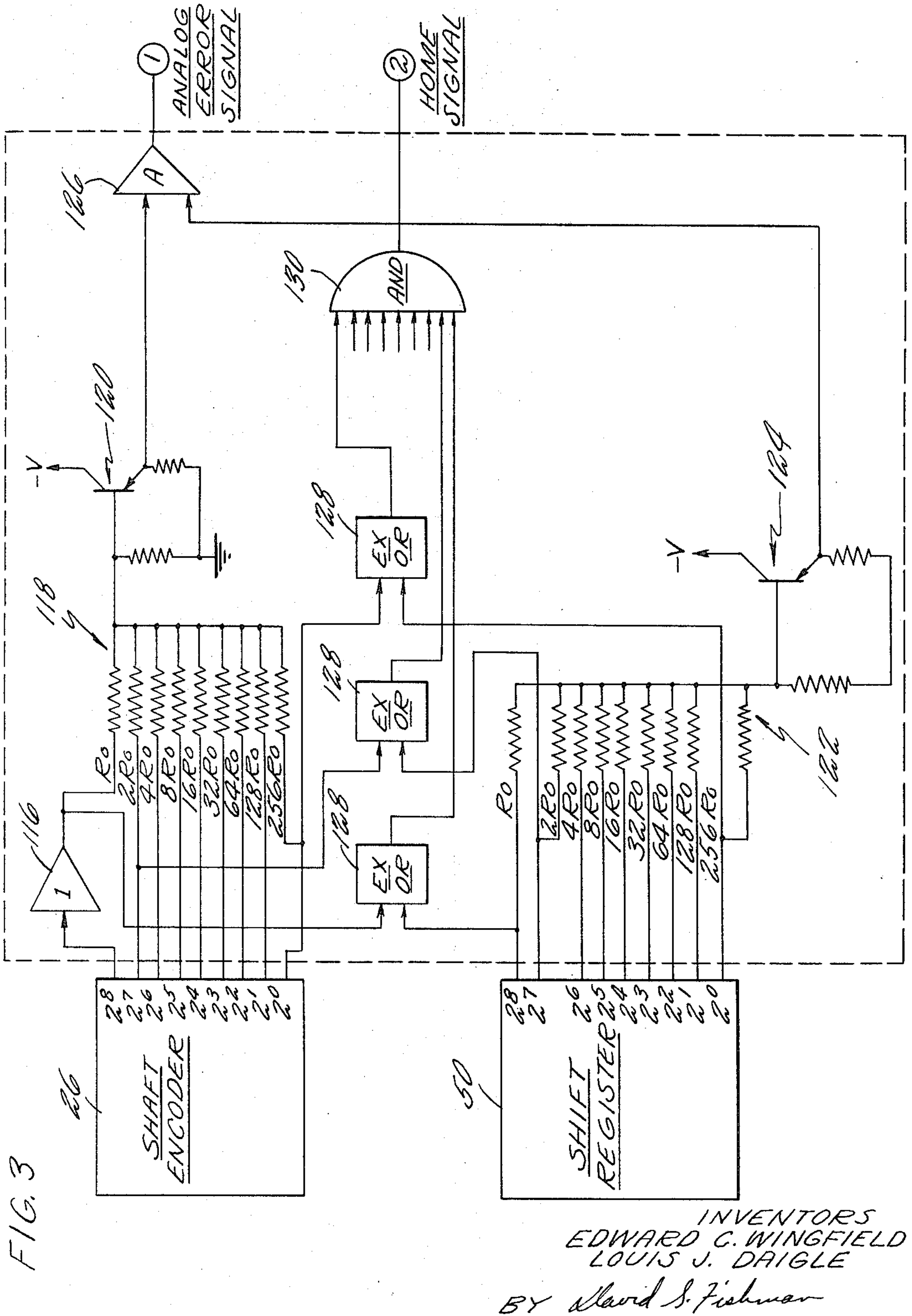
FIG. 3 is a circuit diagram of the homing circuit of FIG. 1.

Referring now to FIG. 3, an inverter 116 is connected to receive the most significant bit from shaft encoder 26. This most significant bit is changed from a "one" level signal to a "zero" level signal or from a "zero" level signal to a "one" level signal downcircuit of inverter 116 to accomplish the eventual result of pointing the receiver directly toward the transmitter. The nine angle bits from $2^0$ to $2^8$ split up one revolution of shaft encoder 26 into 512 equal segments or angle increments. $2^8=256$ or ½ of 512; therefore, the addition or subtraction of this bit by changing a "one" to a "zero" or vice versa will change the angle information downcircuit of inverter 116 by 180°.

An analog error signal is generated in homing circuit 36 to drive motor 24 during homing operation. The outputs from shaft encoder 26 are delivered to summing circuit 118 and the output from summing circuit 118 is impressed on the base of emitter follower 120. Similarly, the outputs from the storage stations in shift register 50 are delivered to a summing circuit 122, and the output of summing circuit 122 is impressed on the base of emitter follower 124. The outputs from emitter followers 120 and 124 are delivered to comparator amplifier 126 where they are compared and the difference between the two signals delivered as an analog error signal to input terminal 1 of master controller 28 and thence through switch 102 to actuate motor 24. The polarity of the analog error signal depends on the output levels from emitter followers 120 and 124, and hence on the sense of the difference in outputs from encoder 26 and shift register 50.

Exclusive OR gates 128 are each connected to one of the parallel outputs from shaft encoder 26 and to the respective storage element of shift register 50, the gate 128 connected to receive the most significant bit from shift register 50 being connected to the output of inverter 116 to receive an inverted signal from the most significant bit of the shaft encoder. The outputs from exclusive OR gates 128 are all delivered to a negative AND gate 130. Exclusive OR gates 128 operate to produce a "zero" level output from any gate when the two signals to that gate are equal and to produce a "one" level output when the two signals differ. Negative AND gate 130 opens to deliver a "one" level signal to input terminal 2 of master control 28 to reset information detector flip-flop 94 only when the outputs from gates 128 are all "zero." It will be understood that a "zero" level signal was previously delivered to input terminal 2 of master controller 28 and thence to AND gate 96 to serve as one input for AND gate 96, but this "zero" level signal is blocked by OR gate 110 which will only pass the "one" level signal generated by the occurrence of "zero" level input signals on all input channels to negative AND gate 130. Thus, AND gate 96 receives the necessary two inputs to open the gate when a marker pulse is delivered to input terminal 4 of master controller 28, and relay 100 is thus actuated to move switch 102 downward to the dotted position.

Referring again to FIG. 2, the analog error signal delivered from comparator amplifier 126 of the homing circuit to input terminal 1 of master controller 28 passes through switch 102 and is amplified in amplifier 104. The amplified signal then passes either through OR gate 79 to energize relay 81 or through inverter 132 and OR gate 78 to energize relay 80. Or gates 78 and 79 will only pass signals of predetermined polarity and amplitude, e.g., a signal of predetermined positive voltage. Thus, if the analog error signal from comparator amplifier 126 is positive, the signal will pass through gate 79 to actuate relay 81 and move switch 86 to the dotted position to connect power source 84 to output terminals 9*a* and 9*b* and thus connect power source 84 across motor 24 for counterclockwise rotation. The positive analog signal is prevented from passing through gate 78 by being inverted to a negative signal by inverter 132. Conversely, if the analog error signal at input terminal 1 is of negative polarity, the signal cannot pass through OR gate 79 but is inverted to a positive signal at inverter 132 and passes through OR gate 78 to actuate relay 80 and move switch 82 to the downward position for clockwise rotation of motor 24.

As motor 24 rotates light source 20 and shaft encoder 26 in either the clockwise or the counterclockwise direction, as the case may be, the inputs to the individual gates 128 from shaft encoder 26 vary in accordance with the position of the shaft encoder, and the output from any gate 128 terminates when the shaft encoder input signal to that gate coincides with the shift register input to that gate. Recalling that the gate 128 connected to receive the most significant bit from shift register 50 is connected to the output of inverter 116, it can be seen that this gate 128 receives an inverted signal of the most significant bit of shaft encoder 26 so that the output from this gate 128 is terminated when the receiver shaft encoder and light source are oriented 180° removed from the angle information stored in the receiver shift register. In this way the receiver light source 20 is positioned to be pointing toward the transmitter. The termination of all input signals to negative AND gate 130 opens AND gate 130 and delivers a "one" level signal to input terminal 2 and through OR gate 110 to reset information detector flip-flop 94. Resetting flip-flop 94 terminates the signal from flip-flop 94 to AND gate 96 so that gate 96 is closed and relay 100 is deenergized to return switch 102 to the up position and terminate operation of motor 24. A carry from the reset side of flip-flop 94 is delivered to set home flip-flop 112, and the output from the set side of home flip-flop 112 is delivered as one of the inputs to AND gates 134 and 136. The output from flip-flop 112 is also delivered to OR gate 74 and passes through OR gate 74 to set transmit flip-flop 76 which in turn supplies an output signal to output terminal 10 to open transmit gate 40.

The opening of transmit gate 40 results in the continuous transmission back to the original transmitter of the angle information corresponding to the position to which the shaft encoder 26 and light source 20 of the receiver unit were rotated upon receipt of the original transmitted information. As with the original transmitter, the angle information corresponding to the new position of the receiver unit is delivered from shaft encoder 26 to converter 32 and thence through transmit gate 40 to signal mixer 42 and modulator 22 to modulate the output from light source 20.

Returning now to the consideration of the transmitter unit, the angle information generated at the receiver unit impinges on the receiver optics 44 of the transmitter unit and is delivered through photomultiplier 46 to signal separator 48 and thence to shift register 50, shift logic 52 and input terminal 4 of master controller 28. Mode switch 56 is positioned for transmit operation so that the ganged mode switches are in the dotted position. The pulse train incident on receiver optics 44 has a marker pulse, a "zero" mode indicating pulse to indicate that the information originated at a receiver unit, and the nine angle bits of information to indicate the azimuth angle of transmission. The marker is detected at monostable multivibrator 90 and AND gate 92 and sets information detector flip-flop 94. The output from the setting of information detector flip-flop 94 passes through AND gate 96, the other input to AND gate 96 being present in the form of a "zero" level signal at input terminal 2, and relay 100 is actuated to move switch 102 to the down position and actuate the motor power source. The output from the setting of information detector flip-flop 94 is also delivered to reset transmit flip-flops 76 and scan flip-flop 72, and flip-flops 72 and 76 remain at least temporarily in the reset condition since these flip-flops are isolated by capacitors 67 and 69 from the "one" level signals at the terminals of switches 66 and 68.

The pulse train is stored in shift register 50, and the "zero" mode designation bit is delivered from shift register 50 to input terminal 6 of master controller 28. This mode designation bit passes through switch 60 but is blocked by OR gate 108; the mode designation bit also passes through switch 64 but is blocked by OR gates 70 and 74. Thus, since the mode designation bit is a "zero" indicating origination of the pulse train at a receiver as desired, the master controller at the transmitter continues operating to home in on this received information. The angle information stored in shift register 50 and the angle information from shaft encoder 26 are both delivered to homing circuit 36 for comparison in the manner described above in the discussion of the homing circuit of FIG. 3, inverter 116 again receiving the output from the most significant bit of shaft encoder 26. Thus, the analog error signal passes through switch 102 to drive motor 24 and position the light signal source 20 of the transmitter in a direction facing the receiver unit that answered the original transmission. When the transmitter light signal source reaches this position the home signal at input terminal 2 of its master controller resets flip-flop 94 to open switch 102 and also set home flip-flop 112 and transmit flip-flop 76. The setting of transmit flip-flop 76 opens transmit gate 40, and the azimuth angle information corresponding to the new position of the transmitter unit light signal source 20 will pass through converter 32, gate 40, signal mixer 42, and modulator 22 to modulate the output from source 20.

Still referring to the operation of the transmitter unit, the next marker pulse incident on receiver optics 44 will be detected at monostable multivibrator 90 and AND gate 92, and the output from AND gate 92 will set information detector flip-flop 94. The output from the set side of information detector flip-flop 94 is delivered after an appropriate delay of about one half a pulse train in one-shot 95 to reset transmit flip-flop 76 to close transmit gate 40 to terminate the transmission of the angle information at the transmitter. The transmitter is then ready for tracking operation and the transmission of intelligence through the designated input channel to signal mixer 42.

Returning now to a consideration of the original receiver unit, a marker pulse from the now properly positioned transmitter will impinge on receiver optics 44 and will be detected by monostable multivibrator 90 and AND gate 92 to set information detector flip-flop 94. The output from the setting of information detector flip-flop 94 will be delivered to reset transmit flip-flop 76 to stop the transmission of angle information from the receiver, and the receiver will then be ready for tracking operation and the reception of intelligence from the proper output channels of signal separator 48. Relay 100 will not be energized this time because a "one" level signal is already present at input terminal 2, and AND gate 96 will not pass this "one" level signal.

Once acquisition has been accomplished, it then becomes important to track. The tracking is absolutely essential in a system in which either the transmitter unit or the receiver unit, or both, are mobile; tracking is also desirable to correct for any drift in a stationary system. The tracking system includes a chopper 55 which can, for example, be a shutter in the form of a semicircular disc mounted for rotation. The disc is driven by drive motor 53 so that it ultimately samples the light incident on first one half of receiver optics 44 and then the other half of receiver optics 44. Differences in the intensity of the light incident on the left and right sides of receiver optics 44 will produce a modulation envelope on the signal received at optics 44 and hence on the output of photomultiplier 46. An oscillatory signal phased with the operation of chopper 55 is derived at chopper drive 53 and is delivered as one input to phase sensitive detector 54. The modulated envelope signal is delivered from signal separator 48 to phase sensitive detector 54 to serve as the other input to the phase sensitive detector, and the modulated signal is demodulated using the oscillatory signal from chopper drive 53 as a reference to yield a phase sensitive error signal which will call for a right or left correction. The output from phase sensitive detector 54 is delivered to input terminal 3 of master controller 28, is amplified at amplifier 138 (FIG. 2) and is delivered to coding circuit 140. Coding circuit 140 may, for example, be an analog to digital converter responsive to the polarity output from phase sensitive detector 54. Coding circuit 140 would put out a continuous transmission of a pulse train at a frequency higher than the intelligence frequency of the communication system to indicate no tracking error; an output from coding circuit 140 of double pulses of the same frequency as the original train could indicate a correction left; and an output of triple pulses at the same frequency could indicate a correction right. The output from coding circuit 140 is delivered to AND gate 136, which has another input from the set side of home flip-flop 112, and passes through AND gate 136 to output terminal 11 of master controller 28. Output terminal 11 is connected directly to signal mixer 42, and the tracking pulse train is delivered from signal mixer 42 to modulator 22 and impressed on the output from light signal source 20. The error signal would ordinarily be generated at the receiver unit to indicate a misalignment or drift of the signal incident on optics 44 of the receiver unit, and the error signal would be transmitted to the receiver optics 44 of the transmitter unit.

The tracking pulse train incident on receiver optics 44 of the transmitter would be delivered by photomultiplier 46 to signal separator 48 and thence to input terminal 5 of master controller 28. This signal at input terminal 5 of master controller 28 would be delivered to AND gate 134, which receives its other input signal from the set side of home flip-flop 112, and the tracking signal would pass through AND gate 134 to digital decoder 142. Digital decoder 142 could be a digital-to-analog converter, and would have two separate output channels one of which feeds OR gate 78 and the other of which feeds OR gate 79 depending on the input pulse pattern to decoder 142. If there is no tracking error there will be no output from digital decoder 142; if there is a tracking error a signal will be delivered to either OR gate 78 or OR gate 79, depending upon the direction of the necessary correction, and either relay 80 or relay 81 will be energized to connect power source 84 across motor 24 to reposition light signal source 20 of the transmitter unit.

It should be apparent that tracking signals will be both generated and received at both the receiver and the transmitter units when the communication system is designed for movement of the transmitter and receiver units relative to each other.

A clearing switch 160 is provided for manual clearing of the system if desired.

Figure 5:
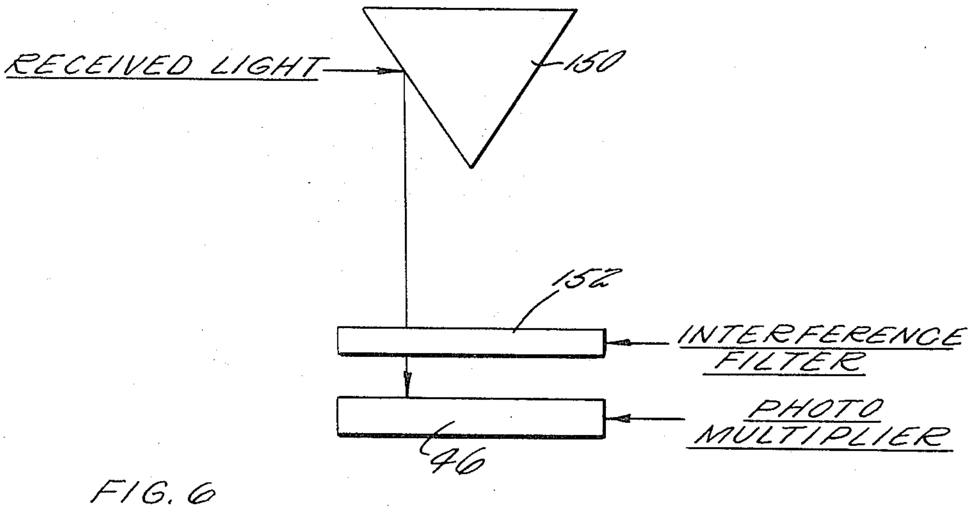
FIG. 5 is a schematic representation of one type of receiver optics suitable for use in the system.
Figure 6:
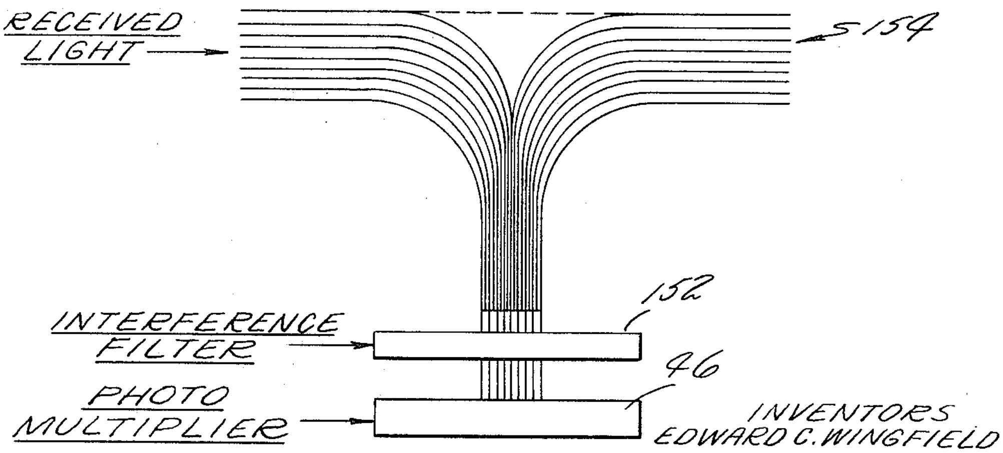
FIG. 6 is a schematic representation of another type of receiver optics suitable for use in the system.

Referring now to FIGS. 5 and 6, two types of receiver optics are shown that are suitable for use as the receiver optics 44. Bearing in mind that any acquisition signal, even an original signal from a transmitter or an answer from a receiver, can originate at any azimuth in a particular plane, the receiver optics must be capable of simultaneously looking in all directions in a plane, i.e., capable of receiving signals from any direction in a plane. The system of FIG. 5 uses an inverted reflecting cone 150 to achieve this omnidirectional capacity. The received light shown in FIG. 1 as being incident on optics 44 is reflected from the surface of cone 150 to photomultipler 46. An interference filter 152 may be placed between cone 150 and photomultipler 46 to discriminate against unwanted wave lengths of light which would constitute noise in the system.

An alternative scheme shown in FIG. 6 involves the use of fiber optics to receive the incident light. A bundle of fiber optics 154 is directed to photomultiplier 46 at one end, and at the other end the fibers are flared out to look in all directions in a horizontal plane for reception of the transmitted light. An interference filter 152 can also be provided if desired.

The acquisition and tracking system described to this point presumes that each unit in the communication system operated on a common azimuth reference. In a more practical system the units would not have common azimuth references, and acquisition operation will then require that each unit generate not only a signal indicating its own angle tof transmission but also transmit a signal corresponding to the signal it received commensurate with the transmitting angle of the other unit. This case requires the use of two shift registers in each unit, one shift register in each unit storing the information commensurate with the transmitting direction of the other unit, and the other shift register of each unit storing the information commensurate with its own transmitting direction. The system also requires another pulse in the pulse train immediately following the marker pulse M, the additional pulse being designated a steering pulse S. This steering pulse S determines whether the angle information following it is scanning information from the unit of the system at which the pulse train originated or a response indicating the transmitting direction of the other unit at which contact was made with the unit generating the pulse train. A "one" or "zero" pulse is sufficient for this bit in the pulse train since there are only two possibilities.

Referring now to FIG. 7, the modified logic and circuitry is shown for the acquisition system wherein the shaft encoders 26 do not have common azimuth references. The elements in FIG. 7 corresponding to elements in FIGS. 1 and 2 are numbered as in FIGS. 1 and 2. Except where the following description states that elements in FIG. 7 replace elements in FIG. 2, the new elements introduced in the FIG. 7 schematic are in addition to the elements shown in FIGS. 1 and 2. The pulse train generated by each unit in this communication system has one more digital bit than in the previously described system, this additional bit being designated as a steering bit S and occurring immediately after the marker pulse M so that the steering bit S is between marker pulse M and the mode bit T or R.

A transmitter desirous of contacting a receiver would generate as a search signal a pulse train such as shown in FIG. 9 having a marker M, a "one" level S bit, a "one" level mode designation T bit, and nine angle bits. The pulse train would be received as in the previous case and delivered to signal separator 48. Output channel 49 of the FIG. 1 system would be replaced by output channel 49*a*, and the pulse train would be delivered via conductor 200 to a coincidence circuit having one-shot monostable multivibrator 202 and AND gate 204. The occurence of a marker pulse would be detected by the coincidence circuit, and a signal would be delivered from AND gate 204 to trigger one-shot monostable multivibrator 206 which would in turn supply one input signal to each of the AND gates 208 and 210, the pulse output from multivibrator 206 stretching that one input to gates 208 and 210 just enough to be present during delivery of the S bit and the mode bit T or R to these AND gates. Gate 208 is connected directly to conductor 200, and the "one" level steering bit constitutes the other input to AND gate 208 so that AND gate 208 delivers a signal to set control flip-flop 212. The setting of control flip-flop 212 delivers one input signal to AND gate 214, the other input to which is in the form of the pulse train from signal separator 48 via output channel 49*a*, and the pulse train information including the S bit, the T bit and the angle bits pass through gate 214 and are stored in shift register 216 for reproduction as part of a reply signal. The logic unit of shift register 216 has a known type of counter operating in the well-known manner for closing an input gate to the storage units when a complete pulse train is stored in shift register 216. AND gate 210 is not opened because the "one" level S signal is inverted at inverter 209 to a "zero" level signal which will not be passed by gate 210. The input to AND gate 208 is delivered simultaneously to AND gate 218 while the output from gate 208 also goes to one-shot monostable multivibrator 220. Multivibrator 220 is selected to have a delay of the width of the S pulse so that the output from multivibrator 220 delivered as an input to gate 218 is delayed until the time that the mode designation bit T or R is delivered directly to AND gate 218. Gate 218 opens only if the mode designation bit is a "one" level pulse corresponding to a transmitter unit pulse train, and the output from gate 218 would be delivered to OR gate 222.

Referring momentarily to FIG. 2, AND gate 218 and OR gate 222 would be positioned in the master controller as shown by the dashed-line representation of these elements, it being understood that these elements would only be included in the master controller when the units do not operate with a common azimuth reference. The output from AND gate 218 would pass through OR gate 222 and would then pass through gates 70 and 74 to set scan flip-flop 72 and transmit flip-flop 76, respectively, to cause scanning operation and to open gate 40 as previausly described. The second storage element in shift register 216 is connected to supply input terminal 6 of the master controller to insure that the receiver unit will be actuated only when the mode designation bit is a "one" level T signal indicating origination of the received information at a transmitter as desired.

The connections from shaft encoder 26 and shift register 216 to inverter 32 are such that the information stored in shift register 216 is first sampled and converted to a serial train and the information from shaft encoder 26 then sampled and converted, the output from shaft encoder 26 indicating the transmitting angle of the receiver unit since the receiver has been placed in a scanning mode of operation. The output from converter 32 thus consists of pulse trains alternately taken from shift register 216 and shaft encoder 26 so that the digital information passing through gate 40 and mixer 42 to be transmittted by receiver light signal source 20 as a reply to the original transmission is composed of two distinct pulse train signals, the pulse train emanating from shift register 216 being an indication of the angle of transmission at which the original transmitter made contact with the receiver unit, and the pulse train emanating from shaft encoder 26 indicating the instantaneous transmitting direction of the signal light source of the receiver unit. Shift register 216 is constructed so that the first storage element, i.e. the steering bit, always generates a static "zero" level output, and the steering bit in the pulse train emanating from shaft encoder 26 is always a "one" level signal to indicate scanning information.

The reply generated at receiver signal light source 20 ultimately impinges on the receiver optics 44 of the transmitter unit since light source 20 of the receiver unit is in a scanning mode of operation. The existence of a marker pulse is detected at the transmitter unit by multivibrator 202 and AND gate 204 to generate an output from multivibrator 206 to supply one input to each of the AND gates 208 and 210. If the pulse train following the marker contains the information stored in receiver unit shift register 216, the steering bit will be a "zero" which will be inverted at inverter 209 and then passed through AND gate 210 to reset control flip-flop 212. A carry from control flip-flop 212 will supply one input to AND gate 224, and the other input to AND gate 224 will be in the form of the pulse train from signal separator 48. The pulse train will then pass through AND gate 224 and be stored in a second shift register, shift register 226, the logic unit of which also has a counter to close an input gate to the shift register when a complete pulse train is stored in the shift register. The next marker pulse would then be followed by the pulse train originating at the shaft encoder of the receiver unit, and the steering bit would be a "one" followed by a "zero" R mode designation bit. The "one" level steering bit and the output from multivibrator 206 would open AND gate 208 to deliver a set signal to control flip-flop 212 to open AND gate 214 and store the receiver unit shaft encoder information in shift register 216 of the transmitter unit for reproduction as part of a return signal. Thus, the information stored in transmitter unit shift register unit 226 would constitute the angle information at which the transmitter first made contact with the receiver, and the information stored in shift register 216 of the transmitter would be the angle at which the receiver was transmitting when its reply was detected by the transmitter. AND gate 218 will not open during this sequence since the mode bit in the pulse train that opens AND gate 208 is a "zero" level signal which will not be passed by gate 218.

In the event that the pulse train following the first marker detected at the transmitter unit is the information from the receiver shaft encoder rather than from receiver unit shift register 216, the order in which transmitter unit shift registers 216 and 226 are loaded will be reversed, but the proper information will still be stored in each shift register.

The pulse passing through AND gate 210 to reset control flip-flop 212 is also delivered to input terminal 4 of master controller 28 and thence directly to set information detector flip-flop 94. Since multivibrator 202 and AND gate 204 have already performed the function of detecting the occurrence of the marker pulse, there is no longer any requirement for multivibrator 90 and AND gate 92 of master controller 28, and elements 90 and 92 are omitted in the configuration embodying the modification of FIG. 7.

The setting of information detector flip-flop 94 allows the transmitter unit to go into the homing mode of operation in the manner previously described with respect to the FIG. 1 and FIG. 2 configuration. The information stored in shift register 226 is delivered to homing circuit 36 for comparison with the information from shaft encoder 26, shift register 226 replacing shift register 50 in the circuit shown in FIG. 3. Motor 24 is energized through the analog error signal at input terminal 1 to rotate light source 20 and shaft encoder 26 of the transmitter until the output from shaft encoder 26 duplicates the information stored in shift register 226. Since the information stored in shift register 226 represents the angle of transmission of the transmitter unit at which contact was made with the receiver unit, it is desired to again position light source 20 of the transmitter at this same angle corresponding to the information in shift register 226 rather than 180° removed as in the previous case. Accordingly, the homing circuit of FIG. 7 omits inverter 116. The homing signal is generated by homing circuit 36 as in the previously described system, and this homing signal is delivered to input terminal 2 of master controller 28 to open transmit gate 40 and allow the transmission of the digital pulse trains carrying the information stored in transmitter shift register 216 and the output from shaft encoder 26 as a return signal to the receiver unit.

The information from shift register 216 of the transmitter unit corresponds to the transmitting angle of the receiver unit at which the signals generated at the receiver were detected by the transmitter unit. Upon being returned to the receiver unit, the S pulse from shift register 216 of the transmitter unit passes through AND gate 210 due to the inversion of the "zero" level S bit, resets control flip-flop 212, opens AND gate 224 to store this information in shift register 226, and delivers a signal to input terminal 4 of the master controller to set information detector flip-flop 94. Thus, the information stored in shift register 226 of the receiver unit corresponds to the position at which the receiver unit was transmitting when its presence was detected by the transmitter unit.

The information from shaft encoder 26 of the transmitter unit is directed to shift register 216 of the receiver unit in the manner previously described, and the receiver unit is then ready for homing action. The information stored in shift register 226 of the receiver unit is compared in homing circuit 36 with the instantaneous output of shaft encoder 26, and a home signal is generated at input terminal 2 of the master controller when the shaft encoder output corresponds directly with the information stored in shift register 226. The homing signal at input terminal 2 resets information detector flip-flop 94 as previously described, and acquisition between the transmitter unit and the receiver unit is then complete since the receiver unit is pointing directly at the transmitter unit and vice versa. Tracking operation and transmission of intelligence can then proceed in the manner previously described with respect to the system shown in FIGS. 1 and 2.

It is to be understood that the invention is not limited to the specific embodiment herein illustrated and described but may be used in other ways without departure from its spirit as defined by the following claims.

We claim:

1. A communication system including first means for transmitting signals, means for changing the azimuth transmitting direction of said first transmitting means, means coordinated with the transmitting direction of said first transmitting means for generating a plurality of signals, each of said signals being commensurate with a particular azimuth transmitting direction of said first transmitting means, means for delivering said signals to said first transmitting means, first means for receiving signals from said first transmitting means, said first receiving means being actuated upon receipt of a signal from said first transmitting means commensurate with a substantially straight line relationship between said first receiving means and the azimuth transmitting direction of said first transmitting means, second transmitting means at said first receiving means, means responsive to the actuation of said first receiving means for positioning said second transmitting means in accordance with said straight line relationship, means for generating a signal at said second transmitting means commensurate with the position of said second transmitting means for transmission by said second transmitting means, second receiving means at said first transmitting means to receive the signal from said second transmitting means, and means actuated by said second receiving means for positioning said first transmitting means in accordance with the signal generated by said second transmitting means to establish an essentially straight line relationship between said first transmitting means and said first receiving means.

2. A communication system as in claim 1 wherein said first transmitting means includes means for generating a narrow and highly collimated beam of energy.

3. A communication system as in claim 1 wherein said means for generating a plurality of signals includes first shaft encoder means, and wherein the means for changing the direction of said first transmitting means includes motor means connected to drive both said first transmitting means and said shaft encoder means.

4. A communication system as in claim 3 wherein said means for generating a signal at said second transmitting means includes second shaft encoder means, and wherein said first and second shaft encoder means have a common azimuth reference.

5. A communication system as in claim 1 wherein said means responsive to the actuation of said first receiving means for positioning said second transmitting means includes means for positioning said second transmitting means at an azimuth position 180° from the azimuth transmitting direction of said first transmitting means at which said first receiving means is actuated.

6. A communication system as in claim 5 wherein said means actuated by said second receiving means for positioning said first transmitting means includes means for positioning said first transmitting means at an azimuth position 180° from the azimuth direction of said second transmitting means at which said second receiving means received signals from said second transmitting means.

7. A communication system as in claim 1 including means for detecting errors in alignment between said first transmitting means and said first receiving means, and means responsive to said detecting means for correcting said errors.

8. A communication system as in claim 1 including means for indicating origination of signals at said first transmitting means, means at said first receiving means for accepting signals from said first transmitting means and rejecting other signals, means for indicating origination of signals at said second transmitting means, and means at said second receiving means for accepting signals from said second transmitting means and rejecting other signals.

9. A communication system including a first unit having signal transmitting means and signal receiving means, means for changing the azimuth transmitting direction of said first unit transmitting means, means at said first unit coordinated with the transmitting direction of said first unit transmitting means for generating a plurality of first unit scan signals for transmission as a search signal by said first unit transmitting means, each of said first unit scan signals being commensurate with a particular azimuth transmitting direction of said first unit transmitting means, a second unit having signal transmitting means and signal receiving means, said second unit receiving means being actuated upon receipt of said search signal from said first unit transmitting means, means responsive to actuation of said second unit receiving means for changing the azimuth transmitting direction of said second unit transmitting means, means coordinated with the transmitting direction of said second unit transmitting means for generating a plurality of second unit scan signals, each of said second unit scan signals being commensurate with a particular azimuth transmitting direction of said second unit transmitting means and being a first part of a reply signal from said second unit, means for generating a signal at said second unit commensurate with the scan signal from said first unit transmitting means at which said second unit receiving means was actuated and being a second part of a reply signal from said second unit, said second unit transmitting means transmitting a reply signal having said first and second parts, said first unit receiving means being actuated upon receipt of said reply signal, means at said first unit responsive to the actuation of said first unit receiving means for positioning said first unit transmitting means in accordance with said second part of said reply signal to generate a return signal to said second unit having as a first part a particular first unit scan signal, means at said first unit for generating a second part of said return signal commensurate with the second unit scan signal at which said first unit receiving means was actuated, and means at said second unit responsive to reception of said return signal by said second unit receiving means for positioning said second unit transmitting means in accordance with said second part of said return signal.

10. A communication system as in claim 9 wherein the means for generating each of said scan signals includes shaft encoder means coordinated with the position of the transmitting means of each unit.

11. A communication system as in claim 9 wherein said means for generating said second part of said reply signal includes reproducing means at said second unit for reproducing the scan signal from said first unit transmitting means at which said second unit receiving means was actuated.

12. A communication system as in claim 11 wherein said means for generating said second part of said return signal includes reproducing means at said first unit for reproducing said second unit scan signal at which said first unit receiving means was actuated.

13. A communication system as in claim 12 wherein said means for positioning said first unit transmitting means in accordance with the second part of said reply signal includes means for comparing said second part of said reply signal with the instantaneous scan signal of said first unit, and means for terminating azimuth direction changes of said first unit transmitting means when said instantaneous scan signal of said first unit corresponds with the second part of said reply signal.

14. A communication system as in claim 13 wherein said means for positioning said second unit transmitting means in accordance with the second part of said return signal includes means for comparing said second part of said return signal with the instantaneous scan signal of said second unit, and means for terminating azimuth direction changes of said second unit transmitting means when said instantaneous scan signal of said second unit corresponds with the second part of said return signal.

15. A communication system as in claim 14 including means for indicating origination of signals at said first unit, means at said second unit for accepting signals from said first unit and rejecting other signals, means for indicating origination of signals at said second unit, and means at said first unit for accepting signals from said second unit and rejecting other signals.

16. A communication system as in claim 15 including means for identifying said first unit scan signals, means at said second unit for directing said first unit scan signals to said second unit reproducing means, means for identifying the first and second parts of said return signals, means at said second unit for directing the first part of said return signal to said second unit reproducing means, and means at said second unit for directing the second part of said return signal to said second unit comparing means.

17. A communication system as in claim 16 including means for indicating the first and second parts of said reply signal, means at said first unit for directing the first part of said reply signal to said first unit reproducing means, and means at said first unit for directing the second part of said reply signal to said first unit comparing means.

18. A communication system as in claim 9 including means for detecting errors in alignment between said first unit transmitting means and said second unit receiving means, and means responsive to said detecting means for correcting said errors.

References Cited

UNITED STATES PATENTS

| | | | |
|---|---|---|---|
| 2,538,063 | 1/1951 | Toavet | 343—101 |
| 2,649,539 | 8/1953 | Robertson | 343—17.5 |
| 3,293,980 | 12/1966 | Benedetti | 88—14 |

JOHN W. CALDWELL, *Acting Primary Examiner.*

B. V. SAFOUREK, *Assistant Examiner.*